United States Patent

[11] 3,559,893

[72] Inventor   Victor H. Gruben
                Rochelle, Ill.
[21] Appl. No.  826,621
[22] Filed      May 21, 1969
[45] Patented   Feb. 2, 1971
[73] Assignee   Swenson Spreader & Mfg. Co.
                Lindenwood, Ill.
                a corporation of Illinois

[54] MATERIAL DISTRIBUTING APPARATUS
     13 Claims, 6 Drawing Figs.
[52] U.S. Cl.................................................. 239/664,
                        239/673, 239/682, 198/217
[51] Int. Cl..................................................... A01c 17/00
[50] Field of Search............................................ 222/176,
            (Inquired); 239/664, 672, 673, 675, 682, 687;
                                198/217, 111, 67, (Inquired)

[56]            References Cited
            UNITED STATES PATENTS
1,940,008   12/1933   Mosgrove..................... 239/664

2,511,514   6/1950   Rosselot........................ 239/664
2,743,932   5/1956   Wester.......................... 239/664

Primary Examiner—M. Henson Wood, Jr.
Assistant Examiner—John J. Love
Attorney—McCanna, Morsbach, Pillote & Muir ABSTRACT: A material-distributing apparatus for use on a vehicle having a material supply hopper, which material-distributing apparatus includes a cross conveyor having an intermediate inlet communicating with the supply hopper and first and second oppositely directed conveyor sections which are shiftable relative to the supply hopper, from a position feeding material from the inlet to relatively opposite sides of the vehicle, to shifted positions in which material is fed to only one or the other side of the vehicle. Spreaders are provided at each side of the vehicle for spreading material fed thereto by the cross conveyor and the spreaders are maintained in a fixed position while the conveyor is shifted.

PATENTED FEB 2 1971

Inventor
Victor H. Gruben

By
McCanna, Morsbach, Pillote & Muir

Attorneys

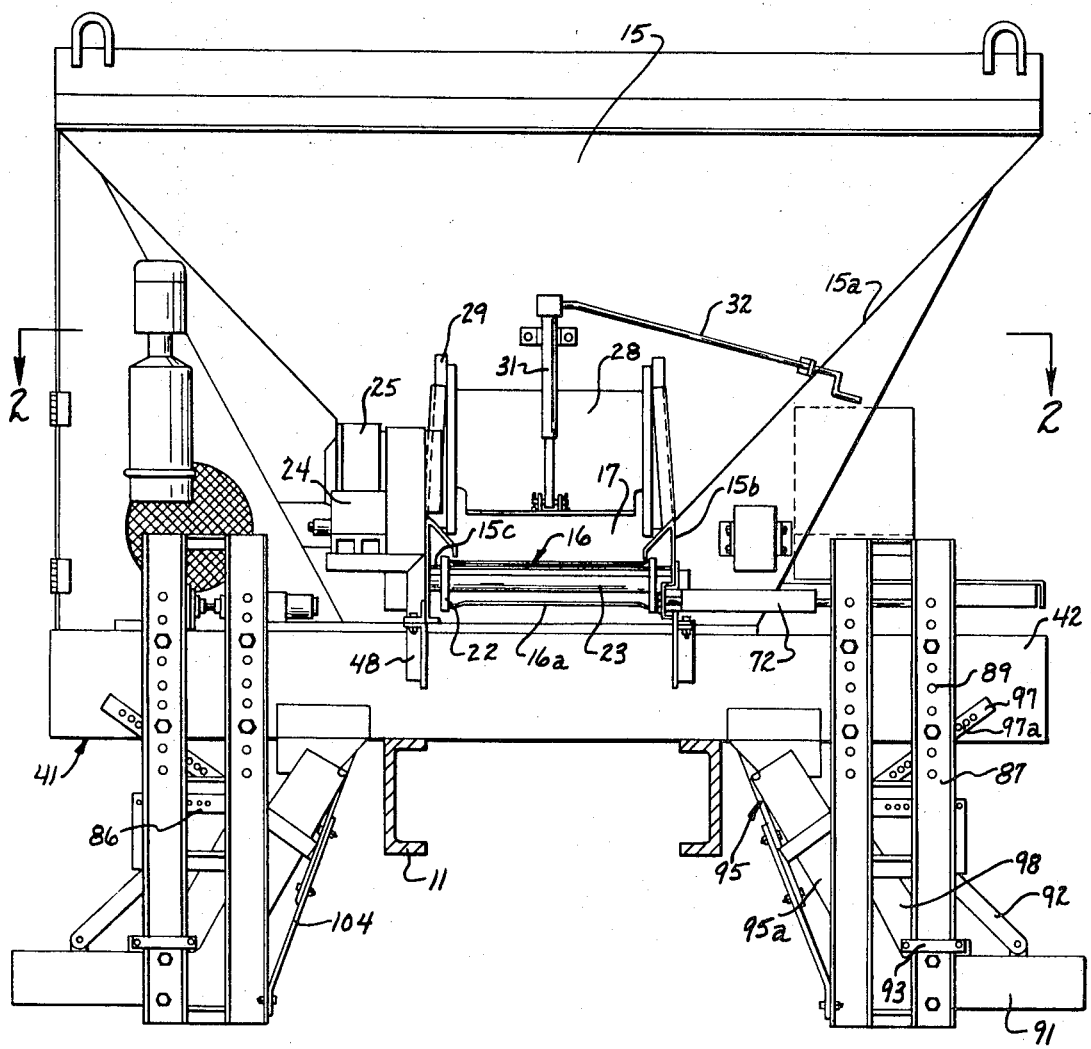

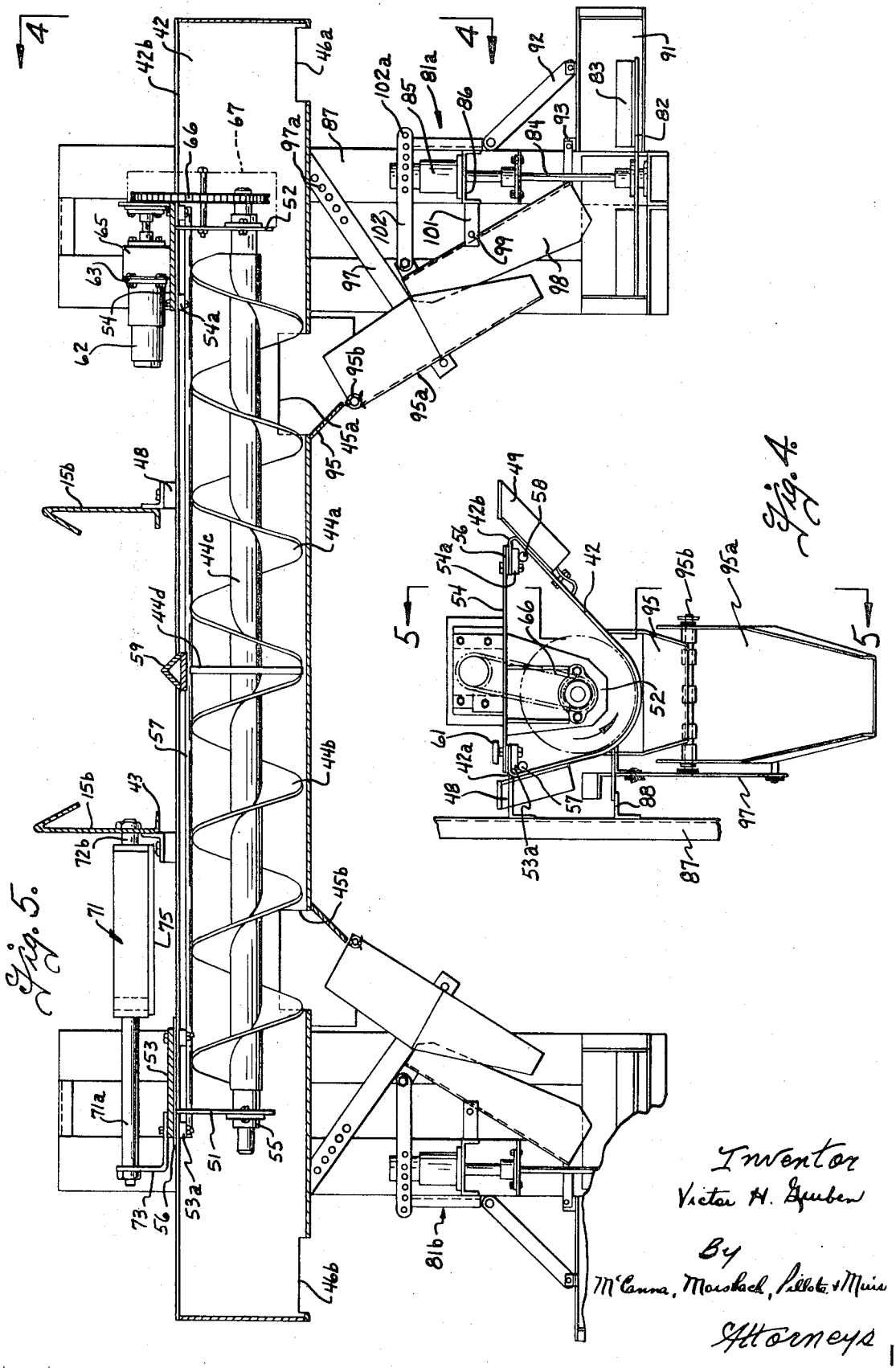

MATERIAL DISTRIBUTING APPARATUS

BACKGROUND OF THE INVENTION

It is heretofore been proposed, as disclosed in the U.S. Pat. to Lutz No. 2,099,369, to provide a cross conveyor on a vehicle having oppositely directed conveyor sections for feeding material simultaneously to a pair of laterally spaced discharge outlets. Such an apparatus is operative to feed material simultaneously to both discharge outlets, but problems are encountered if an attempt is made to feed material selectively to only one or the other of the discharge outlets. In the apparatus disclosed in that patent, discharge of material from only one outlet can only be effected by closing of the the other outlet. However, if one of the discharge outlets in Lutz is closed to prevent discharge of material from one outlet, the oppositely directed feed conveyors would still tend to feed the material toward the other discharge outlet and cause the material to build up and compact in that area.

SUMMARY OF THE INVENTION

In distributing material from a vehicle it is sometimes desirable to spread material from one side of the vehicle, for example when spreading sand, salt to the like on a multiple-lane highway where the vehicle is travelling adjacent one side of the highway, and at other times it is desirable to spread material simultaneously from both sides of the vehicle, for example on a highway where the vehicle is travelling down a path generally centrally of the highway. The material-distributing apparatus includes a cross conveyor having oppositely directed flights for simultaneously feeding material from the material supply hopper to lateral discharge outlets at both sides of the vehicle, and which cross conveyor is shiftable in a direction crosswise of the vehicle to effect feeding of material from the supply hopper to only one side of the vehicle.

An important object of this invention is to provide a material-distributing apparatus for a vehicle which is operable to feed material from a supply hopper simultaneously to both sides of the vehicle or selectively to only one side of the vehicle.

Another object of this invention is to provide a material-distributing apparatus for use on a vehicle in which a pair of material spreaders are mounted on the vehicle in a preselected relation to the vehicle and in which a cross conveyor is mounted for shifting movement relative to the vehicle and to the spreaders to enable delivery of material either simultaneously to both spreaders or alternatively to only one of the spreaders.

Another object of this invention is to provide a material-distributing apparatus for a vehicle having an improved arrangement for mounting and supporting the cross conveyor for shifting movement relative to the vehicle.

These, together with other objects and advantages of this invention will be more readily understood by reference to the following detailed description when taken into connection with the accompanying drawings wherein:

FIG. 3 is a vertical sectional view taken on the plane 3–3 of FIG. 1;

FIG. 4 is a fragmentary end elevational view of the cross conveyor taken on the plane 4–4 of FIG. 5;

FIG. 5 is a fragmentary vertical sectional view taken on the plane 5–5 of FIG. 4 and showing the parts on a larger scale.

Figure 1:
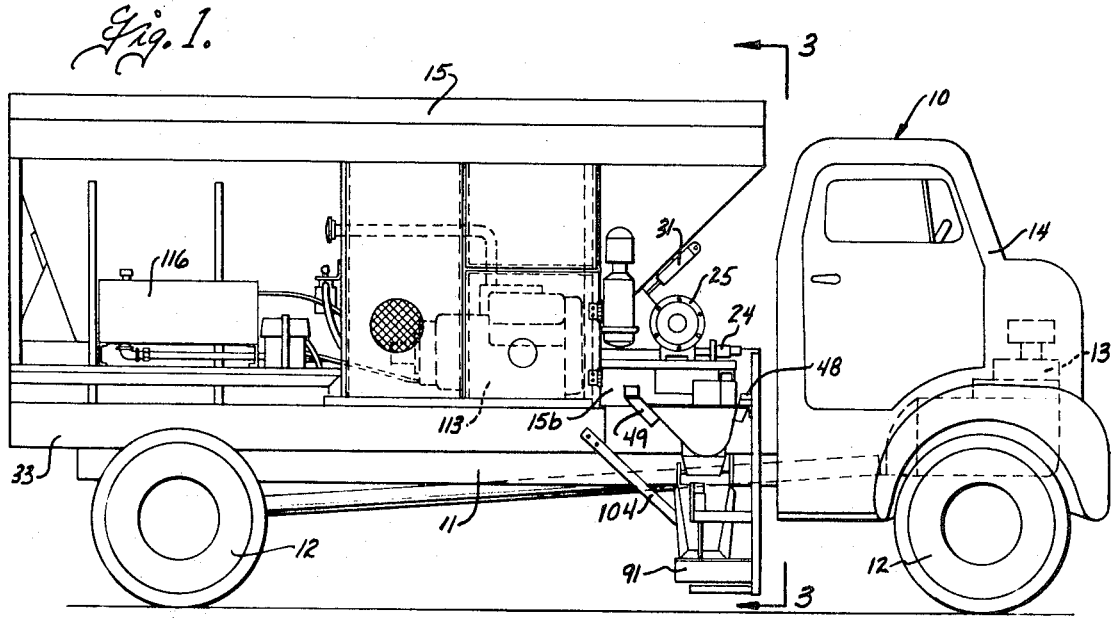
FIG. 1 is a side elevational view of a vehicle having the spreader apparatus of the present invention mounted thereon.

The material-distributing apparatus of the present invention is generally adapted for use on vehicles and is herein shown applied to a truck-type vehicle 10, it being understood that the distributing apparatus could also be applied to trailer-type vehicles. As shown, the truck 10 includes the usual frame 11 supported on ground-engaging wheels 12, motor 13 and cab 14. A material storage hopper 15 is mounted on the vehicle and is preferably of the type having a longitudinal conveyor means 16 for feeding material lengthwise to the vehicle to a discharge outlet 17 (FIG. 3). The hopper illustrated herein is of the V-box type having downwardly converging walls 15a terminating at the lower ends in spaced channels 15b. A bottom wall 15c extends between the channels to support the material in the hopper and the conveyor 16 is arranged to advance material along the bottom wall to the discharge opening 17. In the embodiment shown, the conveyor is of the endless type and includes longitudinally spaced slats 16a attached to conveyor chains 16b, the conveyor chains being entrained over sprockets 22 at opposite ends of the hopper. One pair of sprockets are connected to a conveyor drive shaft 23 conveniently driven by an hydraulic motor 24 through a speed reducer 25.

The hopper discharge opening 17 can be located at either the front or rear side of the hopper, as desired, and is herein shown located at the forward end. A feed control gate 28 is mounted on the hopper for controlling the depth of the material advanced by the conveyor 16 through the discharge opening. The feed control gate is herein shown slidably mounted in guides 29 attached to the hopper for adjustment toward and away from the conveyor 16 and a means such as a screw 31 operable by a crank 32 is provided for selectively raising and lowering the gate 28.

Figure 2:
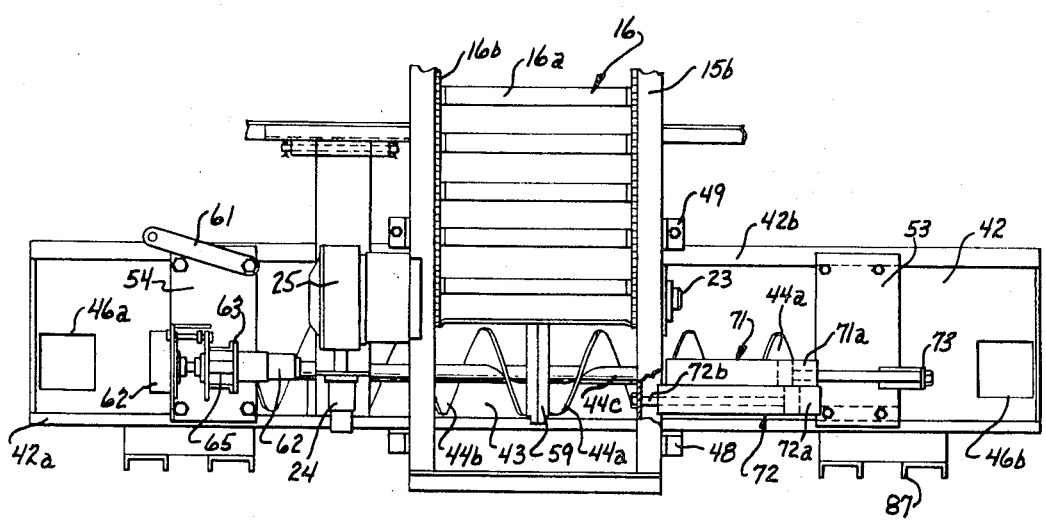
FIG. 2 is a fragmentary horizontal sectional view taken on the plane 2–2 of FIG. 3.
Figure 6:
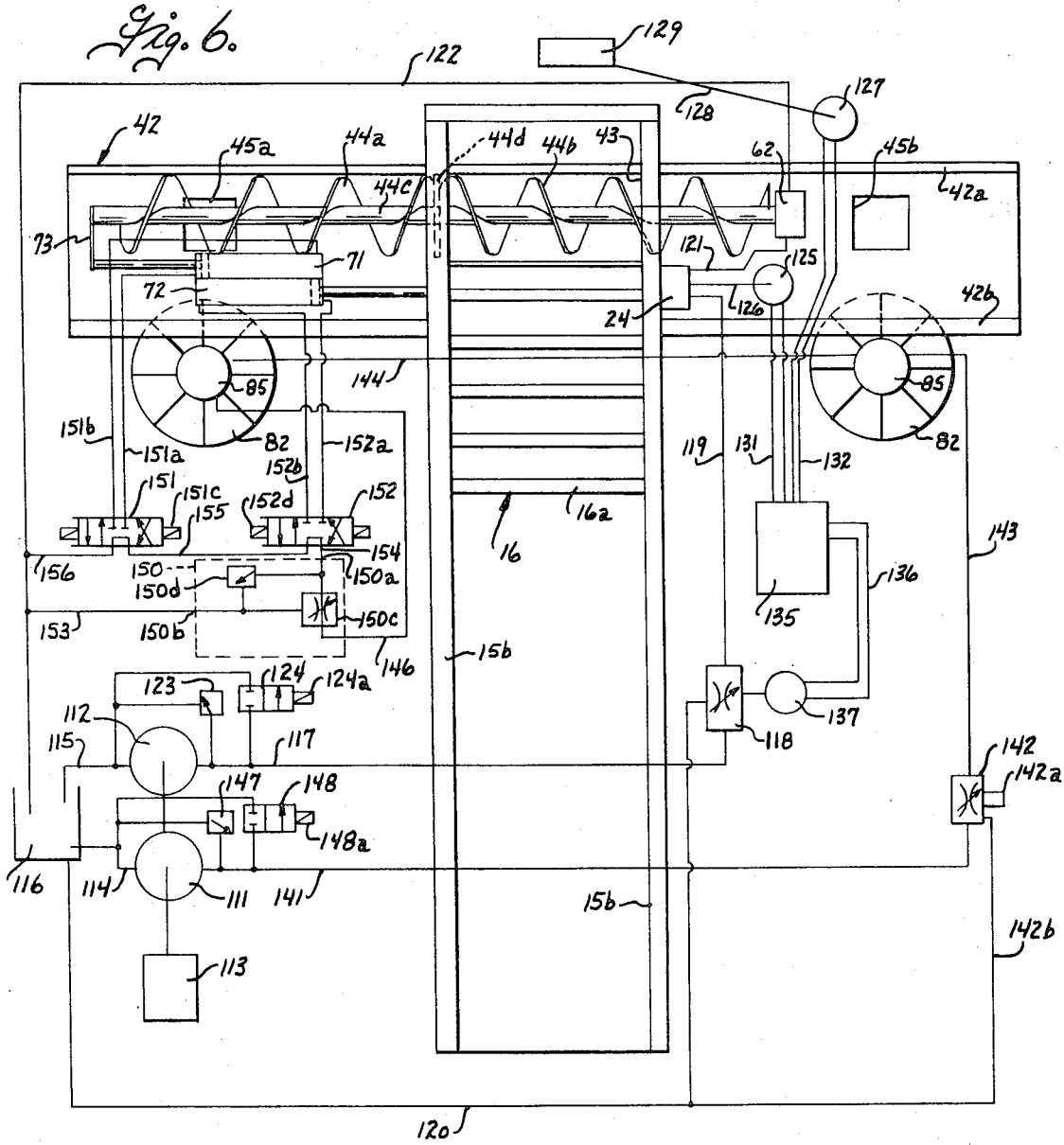
FIG. 6 is a diagrammatic view illustrating the cross conveyor and the hydraulic controls therefore.

As shown in FIG. 1, the hopper 15 is mounted as by rails 33 on the vehicle frame 11 with the conveyor channels 15b spaced above the vehicle frame. A cross conveyor 41 is provided for feeding material from the hopper discharge opening 17 laterally of the vehicle to relatively opposite sides thereof. The cross conveyor 41 includes a material guide 42 extending crosswise of the vehicle and having an intermediate portion positioned to receive material delivered by the hopper conveyor 16. As best shown in FIGS. 2, 5 and 6, the channels 15b of the hopper project forwardly beyond the end of the conveyor 16 and the material guide 42 extends crosswise of the channels 15b at the discharge end of the conveyor so that material from the conveyor 16 is discharged through the opening 43 between the projecting ends of the channels 15b and the end of the conveyor 16, which opening is sometimes hereinafter referred to as the inlet opening for the cross conveyor. The cross conveyor also includes first and second conveyor sections 44a and 44b disposed in end-to-end relation and arranged to feed material in relatively opposite directions from the center thereof to their outer ends. The first and second conveyor sections 44a and 44b are preferably of the auger type, it being understood that other types of conveyor sections such as endless chain type conveyor sections could be used if desired. The auger type first and second conveyor sections 44a and 44b are in the form of oppositely directed helical flights attached to a common shaft 44c and operative, when the shaft is rotated in one direction (counterclockwise as viewed in FIG. 4) to feed material from the adjacent ends of the conveyor sections toward the outer ends thereof. A disc or divider plate 44d is advantageously provided between the adjacent ends of the auger sections, with the plate having an outer diameter corresponding to the diameter of the auger sections. The material guide 42 of the cross conveyor is in the form of a trough preferably having a rounded bottom as shown in FIG. 4 contoured complementary to the underside of the auger flights, and first and second discharge openings 45a and 45b are provided in the trough at relatively opposite sides of the vehicle and spaced outwardly from the material inlet 43 for the cross conveyor. In order to prevent accumulation of any material at the ends of the material guide, the ends may be made open or auxiliary openings such as 46a and 46b can be provided adjacent the underside of the trough at the ends thereof.

The material guide 42 is supported in fixed relation on the vehicle and, as shown, is supported by brackets 48 and 49 on the projecting ends of the channels 15b. The conveyor sections 44a and 44b are supported for shifting movement relative to the material guide 42 and inlet opening 43. As best shown in FIG. 5, the ends of the auger shaft 44c are supported by brackets 51 and 52 attached to slide plates 53 and 54. The shaft is rotatably supported by bearings 55 in the brackets 51 and 52 and the slide plates 53 and 54 are slidably supported on the top flanges 42a and 42b of the material guide. Wear resistant pads 56 are advantageously provided at the underside of the plates 53 and 54 and lugs 53a and 54a are attached to the plates 53 and 54 and underlie the flanges 42a and 42b to retain the slide plates in position on the flanges. The lugs 53a and 54a at each end of the auger are interconnected as by tie bars 57 and 58 which extend lengthwise of the material guide to cause the slide plates 51 and 52 to move in unison and, as shown in FIG. 4, the tie bars closely underlie the flanges 42a and 42b respectively. A flow board 59 having a generally wedged-shaped cross section is secured as by welding to the tie bars 57 and 58 in a position to overlie the divider plate 44d on the auger, as best shown in FIG. 5. The flow board is preferably arranged to project above the material guide a distance such as to span the space between the material guide and the underside of the conveyor channels 15b, when the auger and flow board is shifted laterally from its intermediate position shown in FIG. 5 to a position in which the flow board is adjacent one or the other of the channels 15b. As will be seen, the lugs 53a and 54a are conveniently attached to the plates 53 and 54 by bolts and, if it is desired to lock the auger to the material guide, it is only necessary to tighten one of the bolts sufficient to firmly clamp one of the lugs to one of the flanges on the material guide. In order to facilitate locking of the material conveyor sections in an adjusted position relative to the guide, a lever 61 may be attached as by welding to one of the bolts used for attaching the lugs to the blades. Both conveyor sections are advantageously driven from a common motor and, as shown, an hydraulic motor 62 is mounted as by a bracket 63 on one of the guide plates 54 and connected through a gear reducer 65 and drive chain 66 to a sprocket on the end of the auger shaft 44c. A chain housing 67, shown in phantom in FIG. 5, may be provided around the chain to protect the same.

The auger is thus slidably supported on the material guide 42 for shifting movement relative thereto from an intermediate position as shown in FIG. 5, in which the adjacent ends of the auger sections are laterally centered relative to the inlet opening 43, to first and second laterally displaced positions in which the flow board 59 is adjacent one side or the other of the inlet opening 43. Stated otherwise, the material feed conveyors are shiftable from their midposition shown in FIG. 5 in either direction a distance at least equal to one-half the width of the inlet opening 43 measured in a direction crosswise of the vehicle.

While the conveyor sections can be shifted manually, a power-operated mechanism is preferably provided to facilitate shifting. In the embodiment shown, a pair of linear fluid actuators 71 and 72 are provided and each arranged so that one of the linear actuators 71 is operative to shift the conveyor sections from their midposition to the right as viewed in FIG. 5 and back to its midposition, and the other actuator 72 is arranged to shift the conveyor sections from their midposition to the left as viewed in FIG. 5 and back. As best shown in FIG. 2, linear actuator 72 has its piston rod 72b attached to a stationary support such as one of the conveyor channels 15b and the other of the actuators 71 has its piston rod 71a attached as by a bracket 73 to one of the slide plates such as 53. The cylinders 71a and 72a of actuators 71 and 72 are secured together for movement with each other as by a bracket or plate 75, shown in FIG. 5, and each actuator has a stroke equal to one-half the overall stroke of the feed conveyor sections. Thus, when fluid pressure is applied to the blind end of cylinder 72a, the feed conveyors will be moved to the right as viewed in FIG. 2 until the flow board 59 is positioned adjacent the right side of the inlet 43, and when fluid pressure is applied to the rod end of cylinder 72a, the feed conveyors will be returned to their midposition shown in FIG. 2. Similarly, when fluid under pressure is applied to the rod end of cylinder 71a, the feed conveyors are moved to the left until the flow divider 59 is disposed adjacent the left side of the material inlet 43, and when fluid pressure is applied to the blind end of the cylinder 71a, the feed conveyors will be again returned to their midposition. Hydraulic control valves described more fully hereinafter are provided for selectively operating the actuators 71 and 72. When the conveyor sections 43a and 43b are in their midpositions shown in FIG. 2, material from the inlet opening 43 is delivered equally to both conveyor sections and is conveyed by the sections equally to the discharge openings 45a and 45b. When the conveyor sections are shifted to the right as viewed in FIG. 2, all of the material from the inlet opening 43 is fed to conveyor section 44b and is conveyed by that conveyor to the outlet opening 45b. Conversely, when the conveyor sections are shifted to the left as viewed in FIG. 2, all of the material from the inlet 43 is delivered to the conveyor section 44a and is fed by that section to the discharge opening 45a.

Spreaders 81a and 81b are provided for spreading the material from the discharge openings 45a and 45b respectively. In order to avoid changing of the spread pattern upon shifting of the feed conveyor sections 44a and 44b, the spreaders 81a and 81b are supported in fixed relation to the vehicle and relative to the respective discharge openings 45a and 45b. The spreaders are conveniently of like construction and are herein shown in the form of broadcast-type spreaders having a rotary broadcast member 82 with vanes 83 on the upper surface for impelling the material delivered to the broadcast member. The broadcast members are driven through a shaft 84 from a motor 85, conveniently of the hydraulic type and the motor is supported as by a bracket 86 on hangers 87 secured as by brackets 88 (FIG. 4) to the material guide 42. As is well known, the throw of the rotary broadcast spreaders can be increased and decreased by raising and lowering the broadcast members relative to the surface being covered and, for this purpose the hangers 87 are provided with a plurality of longitudinally spaced openings 89 (FIG. 3) to facilitate vertical adjustment of the spreaders relative to the ground. In order to facilitate control of the direction of the spread pattern of the spreaders, a shroud 91 is provided for each broadcast member to extend part way therearound, which shroud is supported as by brackets 92 and 93 on the lower ends of the hangers 87. A means such as a material guide chute 95 is provided for guiding the material from the discharge opening onto the selected area of the broadcast member and, in order to control the location at which the material is deposited on the broadcast member, and hence to control the spread pattern, the material guide chute 95 is formed with an adjustable section 95a. The section 95a is herein shown swingably supported at 95b on the fixed chute section 95 and a means such as a lever 97 is provided for adjusting the position of the chute section 95a. The lever 97 is formed with a plurality of openings 97a arranged to adjustably secure the lever to one of the hangers 87. An adjustable deflector 98 is also conveniently provided and is spaced from the adjustable chute section 95a to control the width of the stream delivered to the broadcast member. As shown in FIG. 5, the deflector 98 is pivotally mounted at 99 on a bracket 101 secured to one of the hangers 87 and an adjusting lever 102 is attached to the deflector and has a plurality of openings 102a for adjustably securing the lever 102 to a stationary support such as one of the hangers 87. Stabilizer brackets 104 are attached to the hangers 87 and to a stationary part of the vehicle such as the support rail 33 to laterally stabilize the broadcast spreader.

An hydraulic control system suitable for operating the distributor apparatus is schematically illustrated in FIG. 6. In the embodiment shown, a pair of pumps 111 and 112 are driven from a motor. This motor may be the truck engine 13 or an auxiliary engine 113 mounted on the vehicle as shown in FIG. 1. The pumps 111 and 112 have inlets 114 and 115 respectively communicated with a reservoir for hydraulic fluid 116, also conveniently mounted on the side of the vehicle as shown in FIG. 1. One of the pumps 112 is utilized to drive the longitudinal conveyor 16 and the cross conveyor 44. As shown, the outlet line 117 from pump 112 is connected through a flow control valve 118 and line 119 to the hydraulic drive motor 24 for the longitudinal conveyor 16. The cross conveyor is preferably driven at a rate proportional to the speed of the longitudinal conveyor and, for this purpose, the outlet 121 from the conveyor drive motor 24 is connected to the inlet auger drive motor 62, the outlet of which is connected through a return line 122 to the reservoir. Valve 118 is preferably of the adjustable pressure compensated type having its bypass line 118a connected to a reservoir return line 120. As is conventional, a relief valve 123 is provided for relieving excess pump pressure and a selectively operable bypass valve 124 is provided for bypassing the pump 112, when the material distributing apparatus is not in use. Valve 124 is a conventional two-position on-off valve and may conveniently be operated as by a solenoid 124a.

An automatic control apparatus of the type more fully disclosed in the U.S. Pat. to Wilder et al. No. 3,344,993 is advantageously provided for controlling the rate of flow of hydraulic fluid to the conveyor and auger drive motors 24 and 62 to maintain the speed of the same correlative with the speed of the vehicle. In general, this automatic control apparatus includes a first sensing means 125 connected as through a shaft 126 to either the conveyor 16 or conveyor drive motor 24 to produce an output signal correlative with the speed of the conveyor, and a second sensing means 127 connected as through a shaft 128 to a takeoff 129, such as the speedometer cable of the vehicle, to produce a second signal correlative with the speed of the vehicle. The sensors 125 and 126 can be of any suitable type and may, for example, be electro-responsive devices for producing electrical signals correlative with the speed of the vehicle and speed of the conveyor. Sensors 125 and 127 are connected through conductors 131 and 132 respectively to a control unit 135 which compares the signals from the sensors 125 and 127 and produces an output signal correlative with the difference between the signals, which output signal is applied through conductors 136 to a reversible motor 137 for operating the control valve 118. The control unit 135 produces an output signal at lines 136 for driving the motor 137 in a direction to increase or decrease the speed of the discharge means to maintain a preselected ratio between the speed of the discharge means and the speed of the vehicle. As disclosed in the aforementioned patent, a means may be provided in the control system for varying the ratio between the vehicle speed and conveyor speed which is to be maintained by the control unit 135.

Pump 111 is utilized to drive the broadcast members and to also shift the feed auger 44. As diagrammatically shown in FIG. 6, the pump 111 has an outlet line 141 connected through a flow control valve 142 to the inlet of one of the broadcast drive motors 85, the outlet of which drive motor is connected through a line 144 to the inlet of the other hydraulic drive motor, the outlet of which is in turn connected through a line 146 to a flow governor valve unit 150, described hereinafter. In the form shown the hydraulic motors 85 of the two broadcast members are connected in series and are thus driven in unison, it being understood that the system could be otherwise arranged to individually drive the motors 85. As is conventional, a relief valve 147 and a bypass valve 148, conveniently of the type having an electro-responsive actuator 148a, are provided to provide a relief for pump 111 and to selectively bypass pump 112. Valve 142 is preferably of the pressure compensated type having an adjustable orifice which can be remotely adjusted by an electro-responsive operator 142a for a selected rate of flow. The bypass line 142b for the valve 142 is connected to a reservoir return line 120 and, when the orifice in valve 142 is adjusted to a selected setting, the pressure compensated valve operates to maintain a constant rate of flow to the hydraulic motors 85 determined by the orifice setting so that the speed of the broadcast members and hence the area covered thereby remains constant.

A pair of three-position flow control valves 151 and 152 are provided for controlling operation of the linear actuators 71 and 72 respectively for shifting the conveyor sections 44a and 44b. The controlled outlet ports of valve 151 are connected through lines 151a and 151b to opposite ends of the actuator 71 and the controlled outlet lines of valve 152 are connected through lines 152a and 152b to the opposite ends of cylinder 72. Valves 151 and 152 are of the type which are arranged to block the controlled outlet ports when the valve was in its neutral position to thereby hold the cylinders in their moved position and these valves are preferably of the type having an open center at the inlet side. The fluid return from the hydraulic spreader drive motors 85 is conveniently utilized to operate the fluid actuators 71 and 72. As previously described, the return line 146 from the motors 85 is connected to the inlet of a flow governor valve unit 150. Valve unit 150 is a flow divider valve of a type which provides a constant governor flow at a controlled outlet 150a and which operates to bypass excess fluid from the inlet to a bypass outlet 150b. As diagrammatically shown, the valve unit includes an adjustable pressure compensated valve 150c which controls flow from the inlet to the controlled outlet 150a and which operates to bypass excess fluid to the bypass outlet 150b and return line 153. A relief valve 150d is provided for the controlled outlet 150a to prevent build up of excess pressure at the controlled outlet and relief valve 150d is set to open at a pressure substantially below the operating pressure of relief valve 147 so that broadcast members can continue in operation. The controlled outlet 150a of valve 150 is connected through line 154 to one of the inlet ports of valve 152 and, when this valve is in its midposition, fluid under pressure is supplied through line 155 to one of the inlet ports of valve 151. The other inlet port of valve 151 is connected through line 156 to the return line 122. Valves 151 and 152 are of the spring-centered type and are conveniently solenoid operated as by solenoids 151c and 151d and 152c and 152d respectively. The arrangement is such that energization of one of the solenoids of one of the valves moves its valve into one position and energization of one other solenoids moves the valve to its reverse position so that the valves can be conveniently remotely controlled. As will be understood, the solenoids 142a, 148a, 124a, 151c, 151d, 152c and 152d can be operated by remotely positioned switches conveniently located in the cab 14 of the vehicle.

From the foregoing it is thought that the construction and operation of the distributor apparatus will be readily understood. The longitudinal conveyor 16 advances material from the hopper to one end of the hopper and the cross conveyor sections are arranged to feed material from the inlet opening 43 laterally of the vehicle. When the cross conveyor sections are in their midposition shown in FIG. 5, material from the inlet 43 is advanced in both directions to both outlets 45a and 45b to be distributed by both broadcast spreaders 82. When one of the flow control valves such as valve 152 is operated to the right as viewed in FIG. 6, fluid under pressure is supplied to the blind end of actuator 171 to extend the same and move the cross conveyor 44 to the left to the position shown in FIG. 6. When the valve thereafter returns to its neutral position, it operates to hold the cross conveyor in its shifted position until the valve 152 is moved to its other position that is to the left as viewed in FIG. 6 to thereby return the cylinder and auger to its intermediate position shown in FIG. 5. Similarly, valve 151 is operable to selectively shift the auger to the right as viewed in FIG. 6.

When the cross conveyor is shifted either to the left or to the right from its intermediate position, only one of the auger flights is operable to feed material and there is no feeding of material by the other auger so that there is no build up or compaction of material at the end of the material guide opposite the end from which material is being dispensed. The broadcast members 82 do not shift relative to the vehicle or the discharge openings 45a and 45b during shifting of the cross conveyor sections, so that the broadcast spreaders can be preset and provide the same spread pattern independent of the position of the feed conveyors.

I claim:

1. A material storage and discharge apparatus for use on a vehicle comprising, a supply hopper for storing a quantity of material and having an outlet opening, discharge conveyor means communicating with said outlet opening and including first and second conveyor sections and means for driving said first and second conveyor sections to feed material from a first end toward a second end of each conveyor sections, said first and second conveyor sections having said first ends thereof disposed adjacent each other and said first and second conveyor sections extending from their respective first ends in relatively opposite directions, means mounting said discharge conveyor means for shifting movement in a direction lengthwise thereof relative to said outlet opening from an intermediate position in which said first ends of both said first and second conveyor sections are positioned to receive material from said outlet opening selectively to at least one other position in which only the conveyor section is positioned to receive material from said outlet opening whereby the discharge conveyor means is selectively operable to feed material to the outer end of one or both the first and second conveyor sections.

2. A material storage and discharge apparatus according to claim 1 wherein said discharge conveyor means includes a material feed auger having first and second oppositively directed flights forming said first and second conveyor sections, and said drive means comprises a common drive motor for simultaneously driving both said first and second conveyor sections.

3. A material storage and discharge apparatus for use on a vehicle comprising, a supply hopper for storing a quantity of material and having an outlet opening and longitudinal conveyor means for conveying material to the outlet opening, cross conveyor means including first and second conveyor sections disposed in end-to-end relation and means for driving said first and second conveyor sections to feed material from a first end toward a second end of each conveyor section, said conveyor sections having said first ends disposed adjacent each other and extending from their respective first ends in relatively opposite directions, means mounting said cross conveyor means to extend crosswise of said longitudinal conveyor means adjacent the outlet opening in said supply hopper, and means for shifting said cross conveyor means in a direction lengthwise thereof and crosswise of the first conveyor means from an intermediate position in which the first ends of both said first and second conveyor sections are positioned to receive material from said outlet opening selectively to a first position in which only the first conveyor section is positioned to receive material from the outlet opening, and to a second position in which only the second conveyor section is positioned to receive material from the outlet opening whereby the cross conveyor means is selectively operable to feed material to the second end of one or the other or both of the first and second conveyor sections.

4. A material storage and discharge apparatus according to claim 3 wherein said cross conveyor means includes a material feed auger having first and second oppositively directed flights forming said first and second conveyor sections, and said drive means comprises a common drive motor for simultaneously driving both said first and second conveyor sections.

5. A material storage and discharge apparatus for use on a vehicle comprising, a supply hopper for storing a quantity of material and having an outlet opening, an elongated material guide having an intermediate portion positioned to receive material from said outlet opening, said material guide extending in relatively opposite directions from said outlet opening and having first and second discharge outlets spaced in relatively opposite directions from said outlet opening, discharge conveyor means in said material guide including a first and second conveyor sections and means for driving said first and second conveyor sections to feed material from a first end toward a second end of each conveyor section, said first and second conveyor sections having their first ends disposed adjacent each other and extending from the respective first ends in relatively opposite directions along the material guide respectively toward said first and second discharge outlets, means supporting said discharge conveyor means for shifting movement lengthwise of said material guide from an intermediate position in which the first ends of both the first and second conveyors are positioned adjacent said outlet opening to receive material therefrom selectively to a first position in which only the first conveyor section is positioned to receive material from the outlet opening and to a second position in which only the second conveyor section is positioned to receive material from the outlet opening.

6. A material storage and discharge apparatus according to claim 5 including first and second rotary spreader means mounted adjacent said first and second discharge outlets to spread material therefrom.

7. A material storage and discharge apparatus according to claim 5 wherein said supply hopper has a feed conveyor means for feeding material to said outlet opening, said discharge conveyor means extending crosswise of said feed conveyor means.

8. A material storage and discharge apparatus according to claim 5 including fluid actuator means for shifting said discharge conveyor means relative to said trough and valve means controlling said fluid actuator means.

9. A material storage and discharge apparatus according to claim 8 wherein said fluid actuator means includes a first fluid actuator means operable to move the discharge conveyor means from said intermediate position to said first position and back, and a second fluid actuator means for moving said discharge conveyor means from said intermediate position to said second position and back.

10. A material-distributing apparatus for use on a vehicle to enable spreading of material at one or the other or both sides of the vehicle simultaneously comprising an elongated material guide having a material inlet adjacent the center thereof and first and second discharge outlets adjacent relatively opposite ends thereof, a material discharge auger having first and second sections with oppositely directed spiral flights extending from adjacent the center of the auger toward opposite ends of the auger, means for rotating the auger in a direction to feed material from the center toward opposite ends of the auger, means mounting the auger in the material guide for shifting movement in a direction lengthwise of the material guide between a centered position in which the center of the auger is approximately centered with relation to said material inlet to deliver material to both discharge outlets and first and second displaced positions in which the center of the auger is offset to one side or the other of said material inlet to deliver material to one or the other of said discharge outlets.

11. An apparatus according to claim 10 including first and second rotary spreader apparatus mounted on the material guide adjacent said first and second discharge outlets respectively for spreading material from the respective discharge outlet.

12. An apparatus according to claim 10 wherein said material guide is in the form of an open top trough, and carriage means slidably mounted on said trough supporting said auger for shifting movement lengthwise of the trough.

13. An apparatus according to claim 10 including first fluid actuator means for moving said auger means from said centered position to said first displaced position and a second fluid actuator means for moving said auger from said centered position to said second displaced position, and valve means for controlling flow of fluid to said first and second fluid actuators.

PO-1050
(5/69)

UNITED STATES PATENT OFFICE
CERTIFICATE OF CORRECTION

Patent No. 3,559,893         Dated February 2, 1971

Inventor(s) Victor H. Gruben

It is certified that error appears in the above-identified patent and that said Letters Patent are hereby corrected as shown below:

Column 7, line 21, before "conveyor" insert -- one --;
Column 7, line 60, "oppositively" should be -- oppositel Signed and sealed this 15th day of June 1971.

(SEAL)
Attest:

EDWARD M. FLETCHER, JR.
Attesting Officer

WILLIAM E. SCHUYLER,
Commissioner of Pater